June 9, 1942. G. SCHWARZBACH 2,285,466
HYDRAULIC VARIABLE SPEED TRANSMISSION
Filed Oct. 26, 1940 2 Sheets-Sheet 1

INVENTOR
George Schwarzbach
BY
Arthur A. Rust
his ATTORNEY

June 9, 1942.    G. SCHWARZBACH    2,285,466
HYDRAULIC VARIABLE SPEED TRANSMISSION
Filed Oct. 26, 1940    2 Sheets-Sheet 2

INVENTOR
George Schwarzbach
BY
Arthur J. Kent
his ATTORNEY

Patented June 9, 1942

2,285,466

UNITED STATES PATENT OFFICE 2,285,466

HYDRAULIC VARIABLE SPEED TRANSMISSION

George Schwarzbach, Brooklyn, N. Y.

Application October 26, 1940, Serial No. 362,928

9 Claims. (Cl. 74—294)

This invention relates to a hydraulic variable speed transmission device by means of which a driving element such as a shaft can be so connected to another element such as another shaft that power can be transmitted from one to the other of the elements or shafts from a source of power to work at different desired speeds down to zero by either gradual or rapid changes in an effective and convenient manner. Moreover, the direction of driving the driven shaft can be readily reversed and the driven shaft driven at different speeds in its reversed direction. By utilizing additional mechanism the driven shaft can be driven in either direction at higher speeds than that of the driving shaft. The device is useful in many places, such as the transmission or differential for automobiles, for example.

The invention will be understood from the description in connection with the drawings, in which:

Fig. 4 is a side view partly in section showing a modification; and

Figure 1:
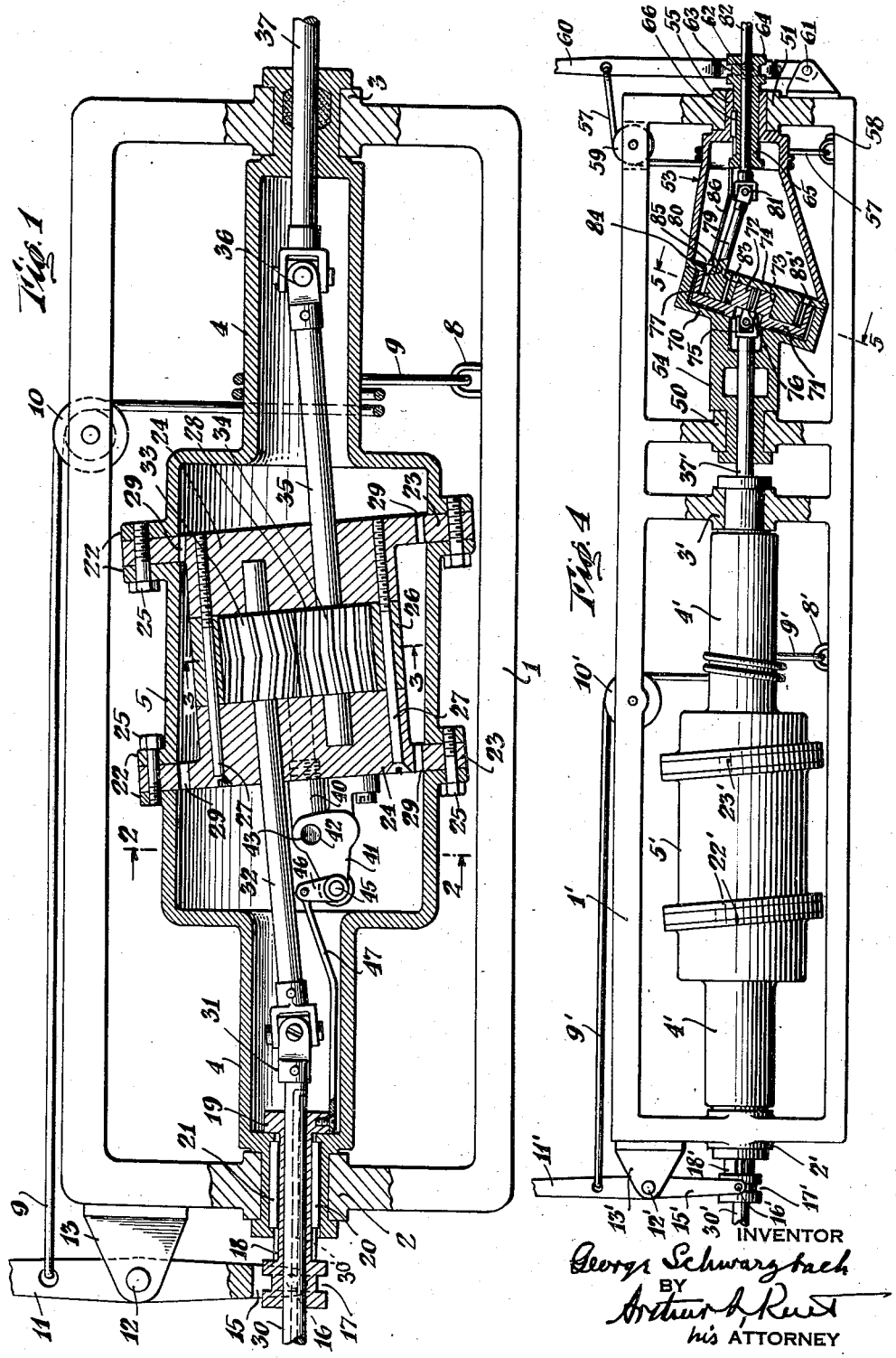
Fig. 1 is a longitudinal section of an illustrative embodiment of the invention.
Figure 2:
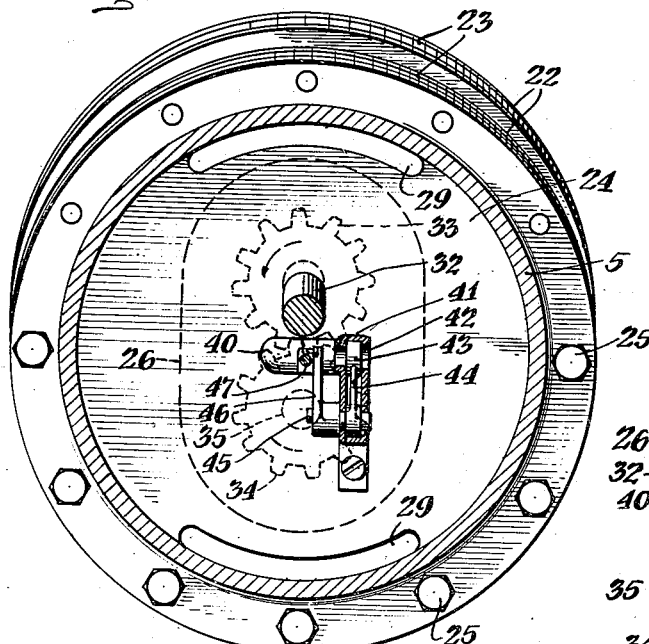
Fig. 2 is a section along the line 2—2 of Fig. 1.

In the drawings, reference character 1 indicates an elongated frame or support having bearings 2 and 3 at opposite ends thereof. A revoluble housing 4 is journaled in the bearings 2 and 3, and has an enlarged central portion 5.

A staple 8 or other holding member is attached to the frame 1 and holds one end of a brake band 9 that passes one or more times around the housing 4, thence over a pulley 10 mounted on the frame 1, and thence to a brake lever 11 that is pivoted at 12 on a lug 13 that is attached to the end of the frame 1. A fork 15 is provided at the lower end of the lever 1 with pins 16 extending into a circular groove 17 in the enlarged end of a hollow member 18 that is slidable in the reduced end of the housing 4 and has an enlarged head 19 inside this housing. Keys 20 and 21 cause the member 18 to revolve with the housing 4.

Figure 3:
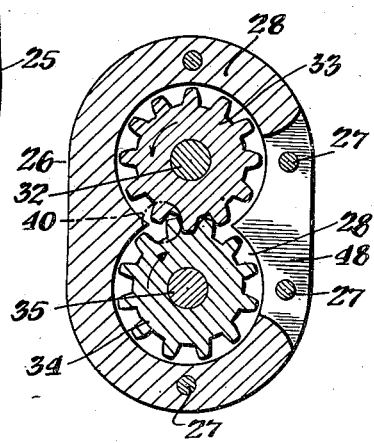
Fig. 3 is a section along the line 3—3 of Fig. 1.

The central portion 5 of the housing 4 may be made up of circular sections having ends with flanges 22 at an angle to the axis of the housing. The corresponding flanges 23 of thick circular member 24 are clamped between the flanges 22 by bolts 25 to make tight joints, and a hollow oblong member 26 (Fig. 3) which forms the peripheral portion of a gear casing is clamped between the members 24 by means of bolts 27, thus providing a tight gear casing 28 in which gears to be described below fit closely. Slots 29 through the flanges 23 inside the casing 5 provide communication for fluid between opposite ends of the housing 4, and to gears to be described.

A shaft 30 that may be driven from any desirable source of power passes through the bearing 2 and central opening in the hollow member 18, and is connected by any suitable flexible connection or coupling such as a universal joint 31, for example, to the shaft 32 which is journaled in bearings in the members 24 and drives a gear 33 which has a close fit in the gear casing 28. An opening 30' may be provided through the shaft 30 to supply liquid to the housing 5. Stuffing boxes may be provided wherever needed in the device.

The gear 33 meshes with the gear 34 which also fits closely in the gear casing and which is carried by a shaft 35 that is also journaled in the member 24. The shaft 35 is connected by means of a universal joint 36, or other flexible connection or coupling, to the driven shaft 37 that is journaled in the reduced end of the housing 4 at the bearing 3.

An outlet 40 leads from the gear casing 28 on one side of the meshing points of the gears 33 and 34 to a valve casing 41, on the other side of which valve casing is an outlet 42 leading into the housing 5. A gate valve 43 in the casing 41 is operated by an arm 44 on the shaft 45 that is connected by the arm 46 to the rod 47 which is connected to the head 19 of the slidable member 18. An opening 48 (Fig. 3) in the form of an elongated slit is provided in the side of the member 26 providing an inlet to the gear casing 28 for entry of liquid between the teeth of the gears 33 and 34.

When the lever 11 is turned clockwise on the pivot 12 to the position shown in Fig. 1, the brake band 9 is loose and the casing 4 is free to turn. At the same time, the hollow member 18 is in the position shown in Fig. 1 so that the rod 47 closes the valve 43 and prevents oil in the valve casing from circulating and thereby prevents the gears 33 and 34 from turning with each other, thus causing them by rotation of shaft 30 to be moved around their contacting line in a planetary motion, carrying casing 4 and the driven shaft 37 in the same direction as the driving shaft 30 and at the same speed. At intermediate positions of the lever 11 and consequent different degrees of opening of the valve 43 and different degrees of looseness of the brake band 9, different speeds of the shaft 37 are obtained.

When the brake band 9 is loose and the valve 43 is open then any resistance to the turning of the shaft 37 or any slight load on it will keep it from turning and at the same time the gear 34 is kept from revolving on its shaft 35 as it swings around with the housing 5 and gear casing 26 while the gear 33 revolves with the shafts 30 and 32 and rolls around the periphery of the gear 34 as both gears are carried around with the housing 5 and gear casing 26.

When the lever 11 is turned farther anti-clockwise around the pivot 12, the brake band 9 is tightened around the casing 4, thus keeping it from revolving. At the same time, the member 18 is moved toward the right, thus causing the rod 47 to open the valve 43 so that the liquid freely escapes from the exit side of the gears 33 and 34 through the outlet 40, and the gears are then free to turn. Under these conditions the driven shaft 37 is driven at the same speed as, but in the opposite direction from, the driving shaft 30 when the gears 33 and 34 are made of the same size.

Figure 5:
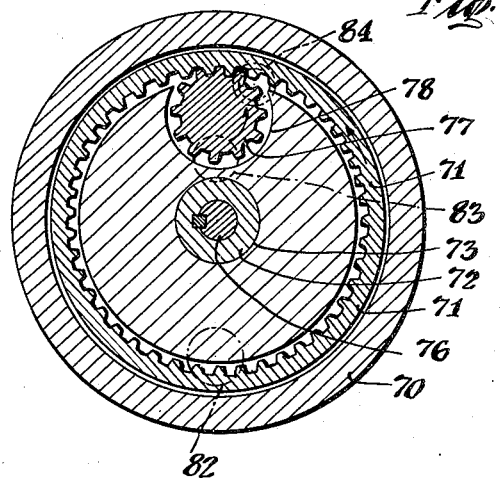
Fig. 5 is a section along the line 5—5 of Fig. 4.

In the modification shown in Figs. 4 and 5, the left-hand portion of Fig. 4 is like Fig. 1 with corresponding reference characters having primes. The frame 1' is extended to accommodate gearing to increase the speed of the driven shaft.

Bearings 50 and 51 are provided in the frame 1' for the mechanism for increasing the speed of the driven shaft. A gear housing 53 for the additional mechanism has hollow extensions 54 and 55 journaled in the bearings 50 and 51, and this housing is enlarged at its intermediate portion between the extensions for the bearings to accommodate the gears and other mechanism.

A brake band 57 extends from the staple 58 around the housing 53 over sheave 59 on the frame 1' to the lever 60 that is pivoted at 61 on a lug on the frame. The lever 60 is divided at an intermediate point and has pins 62 extending into a circular groove 63 in the enlarged end 64 of a hollow member 65 that is slidable in the reduced end 55 of the gear housing 53 and is prevented from turning with respect to this housing by means of a key 66.

A gear casing 70 is provided at the end of the extension 54 and is inclined at an angle to the shaft 37'. An internal gear 71 is provided in the casing 70 and has a hub 72 that is journaled in the bearing 73 that is carried by the plate 74 that is securely attached to the gear casing 70. A universal joint 75 connects the shaft 37' to the stud 76 at the center of the gear 71.

An external gear 77 meshes with the teeth of the gear 71 and is located between the hub 72 and these teeth in a circularly shaped recess 78 (Fig. 5). A shaft 79 is connected to the gear 77 and a bearing 80 is provided for this shaft in the plate 74. A universal joint 81 connects shaft 79 to the shaft 82 that passes through the hollow member 65.

Inlets 83 and 83' are provided through the plate 74 in line with the teeth of the gears 71 and 77, respectively, diametrically opposite the meshing points of the gears 71 and 77. A conically shaped outlet 84 is provided through the plate 74 spaced slightly circumferentially from the point where the teeth of the gears 71 and 77 mesh. A corresponding valve 85 is provided at the end of the rod 86 that is connected to the sliding member 65, for opening and closing the outlet 83.

When the lever 60 is turned to tighten the brake band 57 and keep the housing 53 from turning, the valve 85 is opened so that the gears 71 and 77 are free to turn, thus causing the shaft 82 to be driven much faster than the shaft 37'. When the lever 60 is turned to loosen the brake band 57, the housing 53 is free to turn and the valve 85 is closed so that the liquid which enters through the inlets 82 and 83 and is carried around to the meshing point of the gears 71 and 77 is prevented from escaping through the outlet 84, thus causing the housing 55 and the shaft 82 to revolve at the same speed as the shaft 37'.

In cases where the pressure of the liquid in the gear casings is too great for the types of valves illustrated, valves of other types, adapted to withstand very high pressures, may be used and operated by the sliding members 18 and 65.

What is claimed is:

1. A transmission mechanism, comprising a rotatable housing, a gear casing fixed in said housing, meshing gears in said casing, and means to control the rotation of said gears with respect to each other and to control the rotation of said housing, said means comprising a brake band for said housing and a valve-controlled passageway from said housing through said casing.

2. A transmission mechanism, comprising a rotatable housing, a gear casing fixed in said housing, meshing gears in said casing, and means to control the rotation of said gears with respect to each other and to control the rotation of said housing, said means comprising a brake for said housing and a valve-controlled passageway from said housing through said casing.

3. A transmission mechanism, comprising a rotatable housing, a gear casing fixed in said housing, meshing gears in said casing, means to control the rotation of said gears with respect to each other and to control the rotation of said housing, said means comprising a brake for said housing and a valve-controlled passageway from said housing through said casing, a valve for said passageway, and a connection between said brake and said valve.

4. A transmission mechanism, comprising a frame, a housing journaled in said frame, a brake for said housing, a gear casing fixed in and rotating with said housing, a driving gear and a driven gear in said casing, a passageway through said casing from said housing, a driving shaft for said driving gear, a driven shaft for said driven gear journaled in said housing, and a valve for said passageway.

5. A transmission mechanism, comprising a frame, a housing journaled in said frame, a brake for said housing, a gear casing fixed in said housing, a driving gear and a driven gear in said casing, a passageway through said casing from said housing, a driving shaft for said driving gear, a driven shaft for said driven gear journaled in said housing, a valve for said passageway, and means for simultaneously controlling said brake and valve.

6. A transmission mechanism, comprising a frame, a housing journaled in said frame, a brake for said housing, a gear casing fixed in said housing, a driving gear and a driven gear in said casing, a passageway through said casing from said housing, a driving shaft for said driving gear, a driven shaft for said driven gear journaled in said housing, a valve for said passageway, and means for simultaneously controlling said brake and valve, said means comprising a lever on said frame and a sliding member on one of said shafts.

7. A transmission mechanism, comprising a frame, a housing journaled in said frame, a gear casing fixed in and rotating with said housing, a driving gear and a driven gear in said casing, a driving shaft for said driving gear, and a driven shaft for said driven gear journaled in said housing, said shafts being flexibly connected to said gears.

8. A transmission mechanism, comprising a frame, a housing journaled in said frame, a gear casing fixed in and rotating with said housing, a driving gear and a driven gear in said casing, a driving shaft for said driving gear, and a driven shaft for said driven gear journaled in said housing, the axes of said shafts being at an angle to the axes of said gears.

9. A transmission mechanism, comprising a gear casing mounted to rotate, a pair of meshing gears in said casing, a driving element flexibly connected to one of said gears, a driven element flexibly connected to the other one of said gears, means comprising a valve-controlled passageway to control the rotation of said gears with respect to each other, and a brake on the gear casing to control the rotation of said gear casing.

GEORGE SCHWARZBACH.